(12) United States Patent
Aengenheyster et al.

(10) Patent No.: US 7,265,322 B2
(45) Date of Patent: Sep. 4, 2007

(54) METHOD FOR MAKING A PLASTIC PANE WITH ELECTRICAL CONDUCTOR STRUCTURE AND PLASTIC PANE WITH EMBEDDED WIRES

(75) Inventors: Gerald Aengenheyster, Ludwigsburg (DE); Luc-Henry Blanche, Schwaikheim (DE)

(73) Assignee: Freeglass GmbH & Co. KG, Schwaikheim (DE)

( * ) Notice: Subject to any disclaimer, the term of this patent is extended or adjusted under 35 U.S.C. 154(b) by 468 days.

(21) Appl. No.: 10/489,315

(22) PCT Filed: Sep. 25, 2002

(86) PCT No.: PCT/FR02/03266

§ 371 (c)(1),
(2), (4) Date: Aug. 24, 2004

(87) PCT Pub. No.: WO03/026869

PCT Pub. Date: Apr. 3, 2003

(65) Prior Publication Data

US 2004/0265512 A1    Dec. 30, 2004

(30) Foreign Application Priority Data

Sep. 26, 2001    (DE)    ................. 101 47 537

(51) Int. Cl.
*B60L 1/02*    (2006.01)
(52) U.S. Cl. .................. 219/203; 219/522; 219/543; 219/544; 219/548; 219/541

(58) Field of Classification Search ............... 219/203, 219/211, 522, 543, 219, 544, 548, 541; 264/279, 264/279.1
See application file for complete search history.

(56) References Cited

U.S. PATENT DOCUMENTS

| | | | | | |
|---|---|---|---|---|---|
| 3,287,684 | A | * | 11/1966 | Armbruster | .................. 338/211 |
| 3,484,584 | A | * | 12/1969 | Shaw, Jr. | ..................... 219/522 |
| 3,745,309 | A | * | 7/1973 | Gruss | .......................... 219/522 |
| 3,928,748 | A | * | 12/1975 | Sauer | .......................... 219/522 |
| 4,396,826 | A | * | 8/1983 | Orcutt et al. | ................ 219/522 |
| 4,786,784 | A | * | 11/1988 | Nikodem et al. | ........... 219/543 |
| 5,270,518 | A | * | 12/1993 | Naoumenko et al. | ........ 219/203 |

(Continued)

FOREIGN PATENT DOCUMENTS

DE    1190831    *    3/2002

(Continued)

*Primary Examiner*—Robin Evans
*Assistant Examiner*—Leonid Fastovsky
(74) *Attorney, Agent, or Firm*—Oblon, Spivak, McClelland, Maier & Neustadt, P.C.

(57) ABSTRACT

A process for manufacturing a plastic pane provided with embedded electrical conductors, in particular a window pane, in which the conductors are joined to a surface of a plastic sheet that subsequently receives another layer of plastic by injection molding from the rear for the purpose of forming a pane body. In the process the material of the plastic sheet and the injection-molded plastic are joined together directly by mutual adhesion, and the surface of the plastic sheet that is located on the opposite side from the conductors forms one of the outer faces of the finished pane. The electrical conductors are formed by furnishing the surface of the plastic sheet with at least one metal wire which is to be exposed to the rear injection molding.

13 Claims, 1 Drawing Sheet

U.S. PATENT DOCUMENTS

| | | |
|---|---|---|
| 5,830,397 A | 11/1998 | Hirmer |
| 6,024,904 A | 2/2000 | Nanri |
| 2002/0008411 A1* | 1/2002 | Patz et al. .................. 296/211 |

FOREIGN PATENT DOCUMENTS

| JP | 6-170883 | 6/1994 |
|---|---|---|
| JP | 6-170884 | 6/1994 |
| JP | 6-218764 | 8/1994 |

\* cited by examiner

METHOD FOR MAKING A PLASTIC PANE WITH ELECTRICAL CONDUCTOR STRUCTURE AND PLASTIC PANE WITH EMBEDDED WIRES

The invention relates to a process for manufacturing a plastic pane provided with a structure consisting of embedded electrical conductors, having the features of the preamble of claim 1, and also to a corresponding plastic pane according to the independent claim 14.

In automobile construction, the weight of the bodywork is constantly being reduced. Thus, for example, glass panes are being replaced with plastic panes, preferably made of polycarbonate (PC) or polymethyl methacrylate (PMMA). There are also already in existence hybrid composites consisting of glass and plastic panes. In particular, solutions are being sought to the problem of also replacing glass panes provided with incorporated heating wires or an antenna with plastic panes.

U.S. Pat. No. 5,525,401 discloses a relevant process and a vehicle window made of plastic, in which, during manufacture of said window, an electrically conducting structure is deposited by screen printing on one surface of an initially flat thin plastic film. After the screen-printed pattern, which may also include an opaque peripheral band in the form of a frame, has cured, the printed film may be deposited in an injection-molding mold in which the film may adopt a curved spatial shape. Thus, its printed face is joined to a plastic substrate, which is injection-molded in the mold. In the end product, the conducting structure is enclosed between the film and the body of the pane and is protected from any damage.

However, screen-printing pastes that can be applied in industrial production to plastic surfaces, and which exhibit good electrical conductivity of the level needed for heating, are not available on the market.

Furthermore, the conductor structures that can be produced by conventional screen printing are visually very apparent if they are compared with the small thicknesses of the heating wires available.

Application DE-A1-19 927 999 discloses a plastic laminated pane composed of two relatively thin PC films located on the outside and of a filling layer (the "body of the pane"), also made of PC, which joins them to one another. An electrically conductive coating is printed on the inner face of one of the two films. To make an external electrical connection to the conducting layer, the film in question is penetrated by an outwardly projecting plug contact, which is in internal electrical contact with the layer. The outer faces of both films are provided with scratch-resistant coatings.

Application DE-A1-3 506 011 discloses a process for manufacturing a plastic pane with electrical heating, in which fine wires are laminated to or pressed into the surface of a prefabricated pane body and this surface is then again smoothed by pressing. The material of the pane body must fully encapsulate the heating wires. Finally, bonded to both faces of the approximately 1 mm thick pane body are covering sheets made of crosslinked polyurethane approximately 0.3 mm in thickness by means of thermoplastic polyurethane adhesive layers. The self-healing properties of the latter layers improve the wear resistance and scratch resistance of the outer faces of the pane. Thin metal bands are provided for making electrical contact with the wires embedded in the core layer.

Application EP-A1-7 857 discloses a transparent laminated pane provided with an array of electrically conducting wires, which is essentially laminated to a rigid pane of glass or plastic (PC or PMMA) and to a relatively thin laminated preform composed of a mechanically strong external sheet and an adhesive thermoplastic intermediate sheet provided with applied or incorporated wires. The finished laminated pane can be used mainly as a heated vehicle window. Its external sheet is preferably made of a heat-curing polyurethane with a thickness of about 0.5 mm, its surface exhibiting self-healing properties when exposed to mechanical action. In contrast, the intermediate sheet is made of a thermoplastic polyurethane with a thickness of only about 0.05 mm. The wires are applied after manufacture of the preform laminated to the free face of the intermediate sheet. Next, the laminated preform is joined, by adhesive bonding, to the rigid glass or plastic (PC or PMMA) pane by calendering and, optionally, subsequently subjecting it to an autoclave treatment.

Also known, from patent DE-C2-4 201 620, is a device for depositing fine wires on a plastic sheet, which is designed to be inserted into a laminated pane and which, in particular, itself forms the adhesive sheet for joining the surfaces of two glass panes together. Such laminated panes are used in modern vehicles, as heated windows and/or antenna-incorporated windows, in which the wires must each time be electrically connected to external connectors.

Another case of the application of transparent panes with embedded wires is disclosed in patent DE-C2-4 227 032. The window glazing for buildings described here includes fine parallel metal wires housed in a multiple-glazing unit, radar radiation being reflected off said wires. This application requires no external electrical connector.

The object of the present invention is to disclose another process for manufacturing a plastic pane with an embedded conductor structure, and also a plastic pane that can be manufactured in particular by the process.

According to the invention, this objective is achieved, as regards the process, by the features of claim 1. The features of claim 14 describe a corresponding plastic pane. The features of the secondary claims, subordinated to the respective independent claims, indicate advantageous improvements of the subject matters.

At least one wire or a plurality of wires are thus applied directly to such a relatively thin solid plastic sheet or are integrated into the surface of the latter, that surface of the sheet which is located on the opposite side from the wires forming one of the outer faces of the finished pane. A conductor structure according to the present invention may also be produced by placing an individual wire in a predetermined arrangement, or alternatively an array of wires, for example in the form of loops, meandering patterns and the like. Of course, it is also possible, in order to produce an array comprising several parallel sections, to place, on the face of the sheet, firstly a sinuous wire with curved joining parts located outside or inside the face of the sheet and then to cut off the curved joining parts in order thereafter to connect the ends of the wires via a parallel arrangement by means of busbars.

That face of the sheet which is furnished with the wire or wires is then exposed to an injection via the rear, in a mold, of the substance that will form the pane body. A separate adhesive layer between the sheet and the pane body is eliminated. Of course, plastics are always combined that bond together intimately and lastingly during injection molding of the pane body. Preferably, both the sheet and the additional material for the pane body are made of polycarbonate. However, the sheet and the pane body may not have to be made of the same material. It is also possible to use PMMA and other appropriate materials and optionally combine them, provided that the materials of the sheet and of the pane body are compatible, and therefore provided that they are securely and lastingly bonded to each other by the injection-molding operation. In the optimum case, the surface fusing of the substance injected at the rear with the sheet gives rise to a practically uniform composite obtained from the sheet and the pane body.

As in other panes with incorporated wires, the latter may also, in the panes disclosed here, be used as resistance heating elements, as antenna conductors, as conductors for a breakage alarm loop and/or also for shielding or decorative purposes.

The area of the surface furnished with wires in the end product (and therefore either heating or acting as an antenna) may be freely determined. For example, apart from placing the wires over the entire surface, it is possible to furnish only part of the surface of the sheet with said wires. Furthermore, different "functional fields" (heating, antenna, etc.) may be furnished with wires on one and the same sheet, which wires must not absolutely be electrically connected together but which may be electrically connected to the outside separately from one another, according to the requirements.

It is even possible to employ a sheet area smaller than the total area of the pane. Said total area is then determined only by the pane body, which extends at least on one side beyond the sheet, or else forms a smooth extension of the outer face of the sheet. Transitions between the sheet and the pane body in the outer face of the pane are barely perceptible visually, even in prototypes, as a result of the fusing of the material injected hot under high pressure via the rear with the sheet, in particular also with its cut edge located in the face. It would also be conceivable to provide two or more than two sheet portions on one and the same face of the pane. Where appropriate, the aforementioned different functional fields may also be placed on separate sheets, which are joined via the rear to a common pane body by rear injection molding and are located in the same outer face of the finished pane.

The outline of the sheet portion may be cut virtually at will, not only with a polygonal shape but also a round, elliptical or other shape. In principle, a relatively small sheet portion could be placed in the middle of the face of the pane. Because of the necessary electrical connections, it will be preferred to place at least one part of the surface near the outer perimeter of the pane, if the connectors do not have to be located in the face of the pane. It is also conceivable for an end face, or edge, of the sheet not to be cut along a smooth line, but for it to be given a structure, (for example a sawtooth structure, corrugated structure or irregular structure of the "broken line" type), if this does not degrade the smooth surface of the outer face of the sheet, and at the same time it may serve to camouflage the transition between it and the pane body.

Furthermore, it is also possible, by the technique described here, to furnish two covering sheets with wires and to injection-mold the pane body between said sheets. In this case, various regions of the surface of the pane may also be furnished with wires. Such a heated window, heating on both faces, mounted in vehicles could, for example, be used both for rapidly removing fogging on the inner face and for melting ice on the outer face, the latter aspect being especially necessary in the region where the windshield wipers are at rest. Particularly for the latter arrangement, it is recommended that only a relatively narrow band of sheet furnished with wires on the outer face of the pane be provided and subjected to injection molding via the rear, since in this region of the edge of the pane the transition from the sheet to the pane body may be covered, or masked, for example by an opaque colored frame. The colored frame may be placed on the same face of the pane as said transition, or else on the opposite face of the pane, or even, where appropriate, on that face of the sheet located on the inside. In the latter embodiment, the material of the colored frame must, however, be chosen in such a way that it can be joined without any difficulty to the plastic substance injection-molded subsequently. Even with a colored frame terminating precisely at the transition, the transition is sufficiently masked from the visual standpoint.

In general, the sheet may be provided, on its face that will be located later on the inside, with a heat protection (IR-reflecting) coating, in addition to the furnishing with wires. If two covering sheets are provided, one of them may be furnished with wires and the other may be provided with a heat protection coating.

To lay the wires, one of the known wire-laying methods may be used. Preferably, to achieve the desired arrangement of the wires, a laying head controlled by a programmed robot is used, which is to be guided above the face of the sheet and which continuously impresses or incorporates the wires into the surface of the sheet with a slight pressure and with application of heat. If the wires themselves are heated, they then penetrate easily into the sheet only under very slight pressure. If a laying head carrying out a spatial movement is used, the wires may then be laid even on the free, possibly spherically curved, surface of the sheet, which is already in the mold. As in the prior art, the wires may also be laid in straight lines, along arcs or in the form of corrugations, according to the requirements of the pattern. The wires available have a thickness of between 5 and 500 μm and are of sufficient mechanical stability. Usually the wires are made of tungsten, but wires made of other materials may be used. Because of their small thickness, the wires are practically imperceptible visually in the mounted window, the more so as most of the time both light reflection and light dispersion are minimized by a suitable coating.

Where appropriate, it is also possible to embed the wire or wires in the surface of the sheet by making use of ultrasonic waves; the necessary heat, allowing the wires to penetrate into the surface of the sheet, is then provided directly in the material of the sheet.

Given that the sheet in the injection-molding mold is again heated right into the plastic region of the material, the wire or wires may be laid on a flat sheet portion, which is shaped in the mold to its final surface configuration. As a variant, the sheet portion could also have already received, thermally-plastically, its intermediate or final shape before it is introduced into the injection-molding mold, where appropriate also before laying the wires.

Likewise, "current-collecting" busbars, with which several wires placed parallel may be brought into common electrical contact near the edge of the pane, must be laid along the surface in question and brought into conducting contact with the wire or wires before the injection molding via the rear onto the sheet, as is well known in the prior art.

If the wires have to be provided with external connectors, these may be prepared before injection molding via the rear. Where appropriate, plug-type connectors may be prepared, in a manner known per se, which are also embedded during injection molding of the pane body. They remain accessible from outside, in such a way that the electrical lines (supply and/or antenna lines) can be subsequently brought into contact with the embedded wires by means of plugs.

In a variant, the wire or wires may extend in a suitable injection-molding mold only on one plane or curved (convex) face of the sheet, in which case they extend, at least on one side, over the furnished sheet surface, and the wires may be fixed by the injected material of the pane body, in which case they will also penetrate the surface of the sheet at the latest during heating of the mold.

The same effect may be obtained when the wire or wires are introduced while they are being laid on top of that face of the sheet to be furnished and are temporarily fixed thereto by other means. For this purpose, it is possible firstly to cut one face of the sheet larger than is necessary and later on to remove, by appropriate means, the excess parts of the sheet that are unnecessary, without at the same time cutting the lengths of wire that protrude (free ends, loops). These options cannot be exercised when patterns are printed by screen printing.

In particular, but not exclusively in the preceding cases, the wires may continue toward the outside, beyond the finished pane (in at least one front edge), so as to be, where appropriate, connected thereat to the outside of the face of the pane.

The incorporated or applied wires are in all cases embedded between the sheet and the rear-injected material, which results, compared to the known solutions with wires embedded more on the inside, or alternatively more deeply embedded, in the laminate, with the advantage that the wires are in this case very close to the surface of the thin sheet to be heated. This thus compensates for the poor thermal conductivity of the plastics used and satisfactory short heating times are achieved.

To obtain surface heating as uniform as possible, the wires are laid at relatively short distances apart. Thus at the same time the nonuniformities in thermal elongation of the plastic in the face are minimized.

The sheet may have a thickness of between 0.1 and 1 mm or more, preferably between 0.2 and 0.7 mm. The thickness of the pane body will be advantageously between 1.5 and 8 mm, and where appropriate even more, depending on the surface area of the end product and the envisioned application. Its dimensions are determined by the cavity of the injection-molding mold. Of course, this same cavity may also be suitable, as is well known, for direct formation of other window accessories, for example fixtures, lamps, etc., on the rear-injection-molded substance or on the pane body.

The free outer faces of the sheet and of the pane body are usually provided with scratch-resistant coatings; the sheet may of course be already correspondingly coated before the wires are laid, preferably when said sheet extends over the entire outer face of the pane.

Other details and advantages of the subject matter of the invention will emerge from the drawing of an illustrative example and from its detailed description that follows.

In the drawings, which show in a simplified manner and without any particular scale, fragments of plastic panes:

Figure 1:
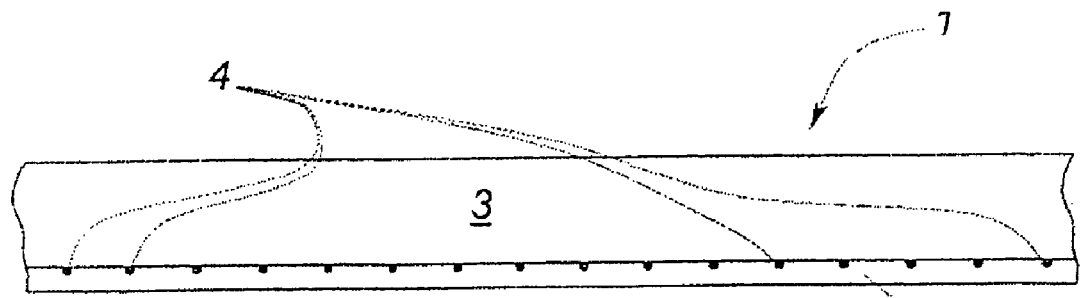
FIG. 1 illustrates a first embodiment, in which a covering sheet provided on only face is furnished with wires oriented so as to be mutually parallel.

A plastic pane 1 according to FIG. 1 is composed essentially of a thin plastic sheet 2 and a pane body 3 securely and lastingly joined to this sheet by rear injection molding in a mold. The interface, or alternatively the join, between the sheet and the pane body is shown here only for the purpose of illustration. In the actual product, it is barely perceptible because the material of the pane body merges into the face of the sheet during rear injection molding. Inserted into that surface of the sheet 2 directed toward the join are a number of fine wires 4 placed parallel to each other at relatively short distances apart. They are entirely embedded in the material of the plastic sheet 2, without piercing the free surface of the latter. The wires 4 are in fact much thinner than the sheet. The injection-molded plastic of the pane body 3 erases any unevenness of the inner face of the sheet. The sheet and the pane body here have the same surface area. A scratch-resistant coating is not shown here. This may be applied to the free face of the sheet before the wires are laid, while of course on the pane body only after it has solidified, before or after it has been taken out of the injection-molding mold.

Once again it should be pointed out that, in the illustrative examples, admittedly a plurality of wires is always used, but it is also possible to produce an array of wires with a single wire, with lengths of wire that are oriented parallel to one another, as illustrated.

Figure 2:
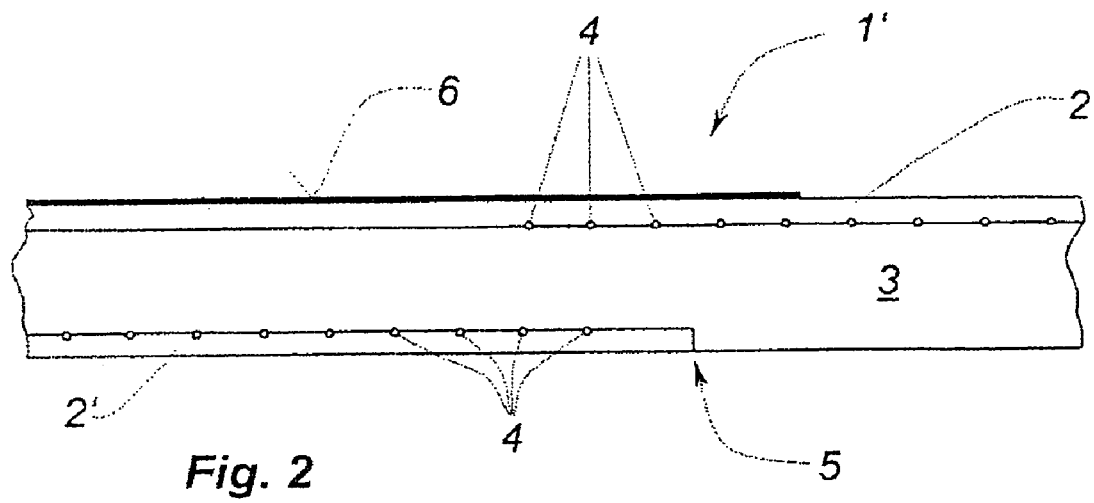
FIG. 2 shows a second embodiment, in which two covering sheets are furnished with wires in different surface portions on either side of the pane body.

In the plastic plane 1' shown in FIG. 2, both faces of the pane body 3 are provided with sheets 2 and 2', which in turn both have incorporated wires 4. In this embodiment, the wires 4 are not entirely embedded in the material of the sheets but in the "join" between the sheets and the pane body formed by injection molding they penetrate slightly into the latter. Furthermore, the sheet 2' is of smaller area than the total area of the pane, so that, at a transition 5, the surface of the pane body 3 forms a flat join with the surface of the sheet 2'. On the other face of the pane 1', the complete sheet 2 is furnished with wires only over part of its inner face. On its outer face, it is provided with an opaque coating 6 in that region in which the transition 5 lies and in which those faces of the sheet that are furnished with wires overlap. The coating 6 thus visually masks these regions in the direction of through-vision.

If such a pane is employed in a vehicle, for example as a rear window, the smaller sheet 2' may then be placed on the face located to the outside in the fitted state, where its wires 4 will be used as a heating field for deicing the rest area for the windshield wipers. At the same time, the wires 4 of the sheet 2 located inside form the usual surface heating for defogging the inner face of the same pane. The heating fields obtained are formed each time near the surface to be selectively heated, so as to ensure that the surfaces of the pane are rapidly heated.

Figure 3:
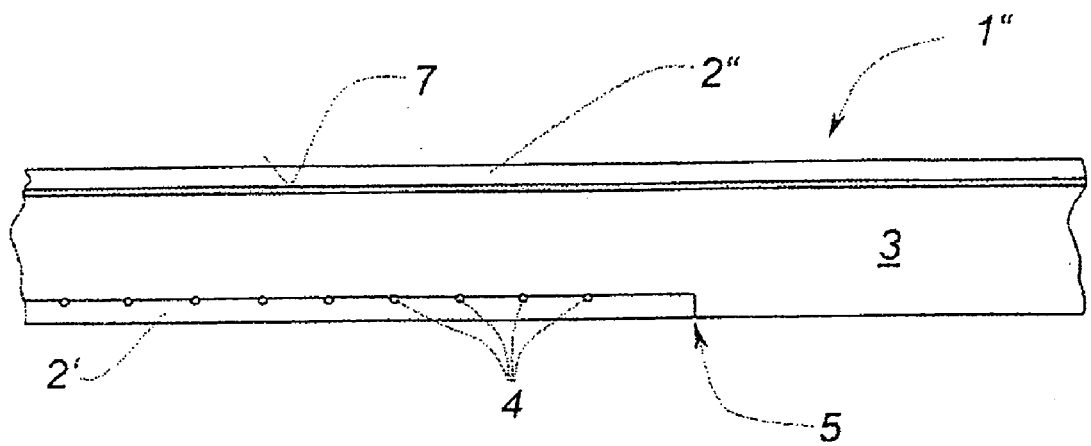
FIG. 3 illustrates a third embodiment, in which one sheet is furnished with wires and a second sheet is provided with a heat protection coating.

In a third embodiment, FIG. 3 shows the same combination of the pane body 3 and a sheet 2' furnished with wires 4 (as in FIG. 2) but with a second covering sheet 2" which is coated, in a known manner, with a transparent coating 7 over the entire surface, protecting it from heat, in particular reflecting the infrared radiation, on its face turned toward the pane body. The latter may have not only the aforementioned passive function, but also, as is known, may be employed as surface heating.

In all the illustrative examples, external connectors according to the known prior art may be provided, at the point where they are needed. It is unnecessary to go into further details regarding this because the corresponding means may be regarded as known.

The invention claimed is:

1. A process for manufacturing a plastic pane provided with embedded electrical conductors, comprising:
   joining the embedded electrical conductors to a surface of a plastic sheet;
   the plastic sheet subsequently receiving, by injection molding from a rear, another layer of plastic for forming a pane body, wherein a material of the plastic sheet and the injected plastic are directly joined together physically, wherein the surface of the plastic sheet located on an opposite side from the conductors forms one of outer faces of the finished plastic pane, and wherein the electrical conductors are formed by furnishing the surface of the plastic sheet to be exposed to the rear injection molding with at least one metal wire.

2. The process as claimed in claim 1, wherein the at least one metal wire is at least partly impressed into the surface of the plastic sheet by a heat action.

3. The process as claimed in claim 1, wherein the at least one metal wire is applied to or extended over the surface of the plastic sheet in an injection-molding mold.

4. The process as claimed in claim 1, wherein the plastic sheet is a thermoplastic sheet with a thickness of between 0.1 and 1 mm.

5. The process as claimed in claim 1, wherein the plastic sheet is a thermoplastic sheet made of polycarbonate (PC) or polymethyl methacrylate (PMMA).

6. The process as claimed in claim 1, wherein the plastic sheet includes a scratch-resistant coating before the plastic sheet is placed in an injection-molding mold.

7. The process as claimed in claim 1, wherein the at least one metal wire emerges into an outside by at least one edge of the plastic pane.

8. The process as claimed in claim 1, wherein contact elements for making external electrical connections for the at least one metal wire are embedded in the another layer of plastic during the injection molding, from the rear, onto the plastic sheet.

9. The process as claimed in claim 1, wherein busbars are deposited on the plastic sheet before the injection molding from the rear, for producing external electrical connections for the at least one metal wire, and are electrically connected to the at least one metal wire.

10. The process as claimed in claim 8, wherein plug-connectors, as contact elements, are embedded with the plastic by the injection molding, such that the plug-connectors are accessible on an outer face of the plastic pane for connection lines to be plugged in.

11. The process as claimed in claim 1, wherein the plastic sheet is of smaller area than a total area of the plastic pane, such that, during the injection molding from the rear, the injected material is injected onto a wall of a mold alongside the plastic sheet and forms a smooth extension of the outer face of the plastic sheet.

12. The process as claimed in claim 1, wherein the plastic sheet is furnished with the at least one metal wire only on one part of an area of a surface of the plastic sheet.

13. The process as claimed in claim 1, wherein wires provided as resistance heating element are deposited on the plastic sheet mutually separated by distances of at most 20 mm, preferably at most 10 mm.

\* \* \* \* \*